United States Patent
Hashimoto

(10) Patent No.: US 7,102,857 B2
(45) Date of Patent: Sep. 5, 2006

(54) ROTARY HEAD DRUM APPARATUS CAPABLE OF POSITIVELY RECEIVING A SPLASHING ADHESIVE

(75) Inventor: Katsuhiro Hashimoto, Hiratsuka (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 350 days.

(21) Appl. No.: 10/792,195

(22) Filed: Mar. 2, 2004

(65) Prior Publication Data

US 2004/0228040 A1 Nov. 18, 2004

(30) Foreign Application Priority Data

May 16, 2003 (JP) ............................. 2003-138803

(51) Int. Cl.
*G11B 5/52* (2006.01)

(52) U.S. Cl. ............... 360/281; 360/271.1; 360/271.2; 360/271.3; 360/271.4; 360/281.1

(58) Field of Classification Search ................ 360/84, 360/270, 271, 271.1, 271.6, 271.8, 271.9, 360/281.7, 281.1, 281.2, 281, 281.8
See application file for complete search history.

(56) References Cited

U.S. PATENT DOCUMENTS

| | | | | |
|---|---|---|---|---|
| 4,392,168 | A | * | 7/1983 | Maruyama et al. .......... 360/129 |
| 4,835,645 | A | * | 5/1989 | Ohji et al. ................ 360/271.9 |
| 5,113,298 | A | * | 5/1992 | Fukushima et al. ...... 360/271.8 |
| 5,343,348 | A | * | 8/1994 | Nishima et al. .......... 360/291.7 |
| 5,363,263 | A | * | 11/1994 | Ohji et al. ............... 360/281.7 |
| 5,392,180 | A | * | 2/1995 | Hasegawa ................ 360/271.7 |
| 5,502,606 | A | * | 3/1996 | Mori et al. ............... 360/291.7 |
| 5,666,245 | A | * | 9/1997 | Cho ......................... 360/271.8 |
| 5,764,442 | A | * | 6/1998 | Komatsu et al. ......... 360/271.7 |
| 5,781,382 | A | * | 7/1998 | Joe .......................... 360/281.7 |
| 5,949,620 | A | * | 9/1999 | Asai et al. ................ 360/271.1 |
| 2003/0161075 | A1 | * | 8/2003 | Inoue et al. ............. 360/271.1 |

FOREIGN PATENT DOCUMENTS

| | | | |
|---|---|---|---|
| JP | 04023202 A | * | 1/1992 |
| JP | 05267067 A | * | 10/1993 |
| JP | 08180342 A | * | 7/1996 |
| JP | 10-007991 | | 1/1998 |
| JP | 2000-018262 | | 1/2000 |
| JP | 2000-195025 | | 7/2000 |

\* cited by examiner

*Primary Examiner*—William Korzuch
*Assistant Examiner*—Matthew Greco Kayrish
(74) *Attorney, Agent, or Firm*—Ladas & Parry LLP

(57) ABSTRACT

A rotary head drum apparatus includes a stator drum. A rotary drum is provided with a plurality of magnetic heads and rotates the magnetic heads. The rotary drum is mounted for rotational movement with respect to the stator drum. A rotary transformer includes a stator-side rotary transformer provided on the stator drum and a rotating-side rotary transformer fixed to the rotary drum. The stator-side rotary transformer and the rotating-side rotary transformer are adapted to send and receive signals to each other. An adhesive providing gap is disposed between the rotating-side rotary transformer and the rotary drum for receiving an adhesive for bonding the rotating-side rotary transformer to the rotary drum. An adhesive splashing prevention part is provided on the rotating-side rotary transformer and receives adhesive splashing from the adhesive providing gap. The adhesive splashing prevention part includes a first ring member having an opening in the center thereof and bonded to the rotating-side rotary transformer with a thermosetting resin adhesive. A second ring member is bonded to the first ring member with the thermosetting resin adhesive and has in the center thereof an opening whose diameter is smaller than the diameter of the opening of the first ring member. The adhesive splashing prevention part forms a space receiving adhesive splashing from the adhesive providing part.

7 Claims, 9 Drawing Sheets

ROTARY HEAD DRUM APPARATUS CAPABLE OF POSITIVELY RECEIVING A SPLASHING ADHESIVE

BACKGROUND OF THE INVENTION

1. Field of the Invention

The present invention generally relates to rotary head drum apparatuses, and more particularly, to a rotary head drum apparatus having a rotary transformer.

2. Description of the Related Art

Generally, rotary head drum apparatuses are used in video tape recorders and digital audio tape recorders (hereinafter referred to as "DATs") as means for performing a magnetic recording/reproducing process on magnetic tapes (recording media). A rotary head drum apparatus is formed by, for example, a lower fixed (stator) drum and an upper rotary drum. Four, for example, magnetic heads are mounted on the upper rotary drum at predetermined intervals. Thus, as the upper rotary drum is rotated, the magnetic heads are also rotated, and a magnetic recording/reproducing process is performed on a magnetic tape that is wound around the rotary head drum apparatus in a helical manner.

FIG. 1 shows a conventional rotary head drum apparatus 1. A rotary drum 2 is rotated on a stator drum 3 by rotating a shaft 5. The shaft 5 is press fit into a shaft opening 6 of the rotary drum 2 and rotated by a motor 4 provided under the stator drum 3.

A magnetic head 8 held by a head base 7 is provided to the rotary drum 2. The head base 7 is formed by, for example, a metal substrate, and the magnetic head 8 is provided at an end of the head base 7. The head base 7 is fixed to a bottom surface of the rotary drum 2 by a head fixing screw 9.

A rotating-side rotary transformer 10, which forms a rotary transformer, is fixed to the bottom of the rotary drum 2. The rotating-side rotary transformer 10 is positioned to face a stator-side rotary transformer 11 that is provided to the stator drum 3. A coil 12 is wound on each of the rotating-side rotary transformer 10 and the stator-side rotary transformer 11. The rotating-side rotary transformer 10 and the stator-side rotary transformer 11 send and receive signals without contacting each other between the rotary drum 2 and the stator drum 3 by an electromagnetic induction effect between the coils 12.

A terminal 13 is provided on the rotating-side rotary transformer 10. A terminal 14 electrically connected with the magnetic head 8 is provided on the terminal 13. An end of the coil 12 is electrically connected to the terminal 14. Thus, it is possible to supply a signal reproduced by the magnetic head 8 to a signal flexible substrate (not shown) that is provided to the stator drum 3 via the terminal 13, the rotating-side rotary transformer 10, and the stator-side rotary transformer 11. In addition, a recording signal from the signal flexible substrate may be supplied to the magnetic head 8 via the rotating-side rotary transformer 11, the stator-side rotary transformer 10, and the terminal 13.

The rotary drum 2 includes a cylindrical connecting part 2a disposed at a position facing the rotating-side rotary transformer 10. An adhesive providing part 15 is formed in an end surface of the cylindrical connecting part 2a. The adhesive providing part 15 is filled with an adhesive 16 for fixing the rotating-side rotary transformer 10 to the rotary drum 2. The rotating-side rotary transformer 10 is fixed to the rotary drum 2 with the adhesive 16. It should be noted that the height of the adhesive providing part 15 is about 0.2–0.3 mm at most.

Referring more closely to the terminal 13, which is provided on the top surface of the rotating-side rotary transformer 10, an end of the terminal 13 abuts the outside wall of the cylindrical connecting part 2a of the rotary drum 2, and a groove is formed in a bottom portion of the abutting portion of the terminal 13 to serve as an adhesive splashing prevention part 17.

The adhesive splashing prevention part 17 is provided in order to prevent excessive adhesive 16 from splashing from the adhesive providing part 15. Thus, even if the adhesive 16 splashes from the adhesive providing part 15, the adhesive splashing prevention part 17 provided in close vicinity of the adhesive providing part 15 prevents further splashing. Hence, it is possible to prevent peripheral devices of the rotary head drum apparatus 1 from being contaminated by the adhesive 16.

Experience shows that, since the rotary head drum apparatus 1 is produced in large quantities, there is a possibility that the adhesive 16 may be excessively applied in a filling process of the adhesive 16. Conventionally, an excessive adhesive is typically removed by a worker wiping away the excessive adhesive. However, by providing the adhesive splashing prevention part 17, it is possible to eliminate such a wiping operation (refer to Japanese Laid-Open Patent Application No. 2000-195025, pages 4–6, and FIGS. 1–3 for example).

However, the adhesive splashing prevention part 17 is formed by forming a groove in the terminal 13, which is a thin member. It is a difficult operation to form a groove in a thin member. In this case, there is a problem in that required time and costs are increased.

Additionally, the adhesive splashing prevention part 17 is formed by forming a relatively small groove at the end of the terminal 13, as it is too difficult to form a large groove in a thin member. Consequently, with such a thin member and such a small groove, in a case where a large amount of the adhesive 16 splashes from the adhesive providing part 15, it is difficult or impossible to receive all of the splashing adhesive 16 in the groove.

SUMMARY OF THE INVENTION

A general object of the present invention is to provide an improved and useful rotary head drum apparatus in which one or more of the above-mentioned problems are eliminated.

Another and more specific object of the present invention is to provide a rotary head drum apparatus that can be easily manufactured and can positively receive an adhesive.

In order to achieve the above-mentioned objects, according to one aspect of the present invention, there is provided a rotary head drum apparatus including:

a stator drum;

a rotary drum provided with a plurality of magnetic heads and rotating the magnetic heads, the rotary drum being mounted for rotational movement with respect to the stator drum;

a rotary transformer including a stator-side rotary transformer provided on the stator drum and a rotating-side rotary transformer fixed to the rotary drum, the stator-side rotary transformer and the rotating-side rotary transformer being adapted to send and receive signals to each other, wherein an adhesive providing gap is disposed between the rotating-side rotary transformer and the rotary drum for receiving an adhesive for bonding the rotating-side rotary transformer to the rotary drum; and an adhesive splashing prevention part provided on the rotating-side rotary transformer and receiving adhesive splashing from the adhesive providing gap, the adhesive splashing prevention part including:
a first ring member having an opening in the center thereof and bonded to the rotating-side rotary transformer with a thermosetting resin adhesive; and
a second ring member bonded to the first ring member with the thermosetting resin adhesive and having in the center thereof an opening whose diameter is smaller than a diameter of the opening of the first ring member,
wherein the adhesive splashing prevention part forms a space receiving adhesive splashing from the adhesive providing part.

According to the above-mentioned aspect of the present invention, the adhesive splashing prevention part is formed by bonding the two ring members on the rotating-side rotary transformer. Hence, it is possible to form with an arbitrary size the space for receiving a splashing adhesive. In addition, those members forming the adhesive splashing prevention part may be bonded with a thermosetting resin adhesive before assembly with components that are weak against heat. For this reason, it is possible to cure the thermosetting resin adhesive without deleteriously affecting components that are weak against heat.

Additionally, in the above-mentioned rotary head drum apparatus, a flexible printed circuit may be connected to a bottom surface of the rotary drum, the flexible printed circuit may include an upper ring connected to the rotary drum and a lower ring connected to the rotating-side rotary transformer, and electrically connect the magnetic heads with the rotating-side rotary transformer, and the lower ring may be used as the second ring member.

Accordingly, by using the lower ring of the flexible printed circuit as one of the ring members of the adhesive splashing prevention part, it is possible to reduce the number of components.

Additionally, the first ring member may have a ring-shaped groove formed in at least one of the top surface and the bottom surface thereof, and a thermosetting resin may be disposed in said groove.

Accordingly, by filling the groove or grooves formed in the ring member with a thermosetting resin (inserting a thermosetting resin into the groove or grooves formed in the ring member), it is possible to form the adhesive splashing prevention part leaving no or substantially no space between those members forming the adhesive splashing prevention part. Hence, it is possible to prevent an adhesive received by the adhesive splashing prevention part from leaking therefrom.

Additionally, the adhesive splashing prevention part may include an adhesive splashing prevention member including:
a first part corresponding to the first ring member:
a second part corresponding to the second ring member: and a ring-shaped groove in a bottom surface of the first part,
the first and second parts forming an integral part, and
the adhesive splashing prevention member may be bonded on the rotating-side rotary transformer with a thermosetting resin adhesive filled in the ring-shaped groove whereby a space receiving the adhesive splashing from the adhesive allocation part is formed.

Accordingly, by forming the first and second ring members with an integrally molded member, it is possible to eliminate a process for bonding the first ring member and the second ring member.

According to the present invention, it is possible to positively provide the adhesive splashing prevention part in the rotary head drum apparatus leaving no or substantially no space in between by using the thermosetting resin adhesive. In addition, it is possible to form with an arbitrary size a space for receiving an adhesive that splashes from the adhesive providing part.

Other objects, features and advantages of the present invention will become more apparent from the following detailed description when read in conjunction with the following drawings.

BRIEF DESCRIPTION OF THE DRAWINGS

FIG. 5-(B) is a cross-sectional view of the adhesive splashing prevention part taken along the line X—X in FIG. 5-(A);

FIG. 6-(B) is an enlarged cross-sectional view showing a state after the adhesive splashes from the adhesive receiving gap, and the splashing adhesive is received by a chasm of the adhesive splashing prevention part;

FIG. 7-(B) is a cross-sectional view of the adhesive splashing prevention part taken along the line Y—Y in FIG. 7-(A);

FIG. 8-(B) is an enlarged cross-sectional view showing a state after the ring member is bonded with a thermosetting resin adhesive filled in the V-grooves; FIG. 9-(B) is a cross-sectional view of the adhesive splashing prevention part taken along the line X—X in FIG. 9-(B).

DETAILED DESCRIPTION OF THE PREFERRED EMBODIMENTS

A description is given below of preferred embodiments of the present invention with reference to the drawings.

Figure 1:
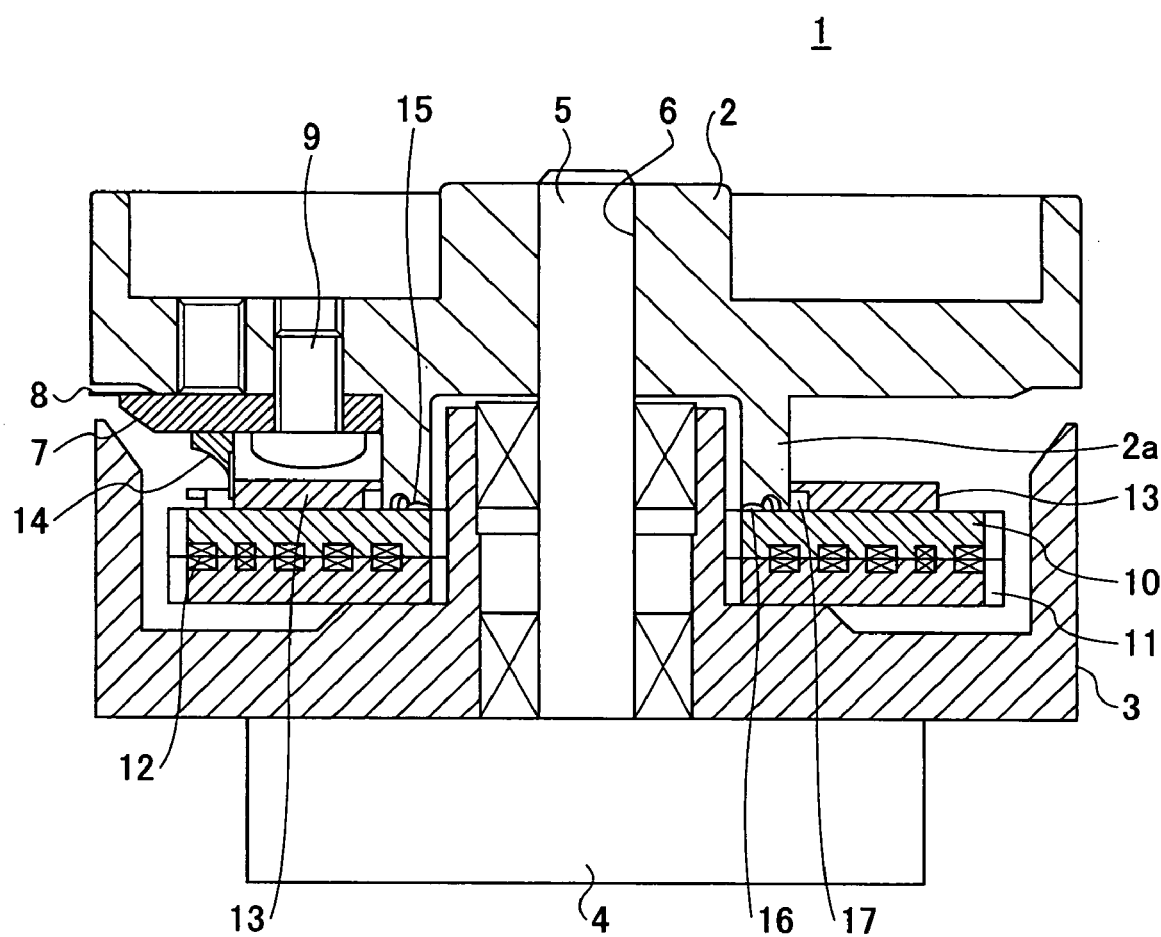
FIG. 1 is a schematic diagram showing a conventional rotary head drum apparatus.
Figure 2:
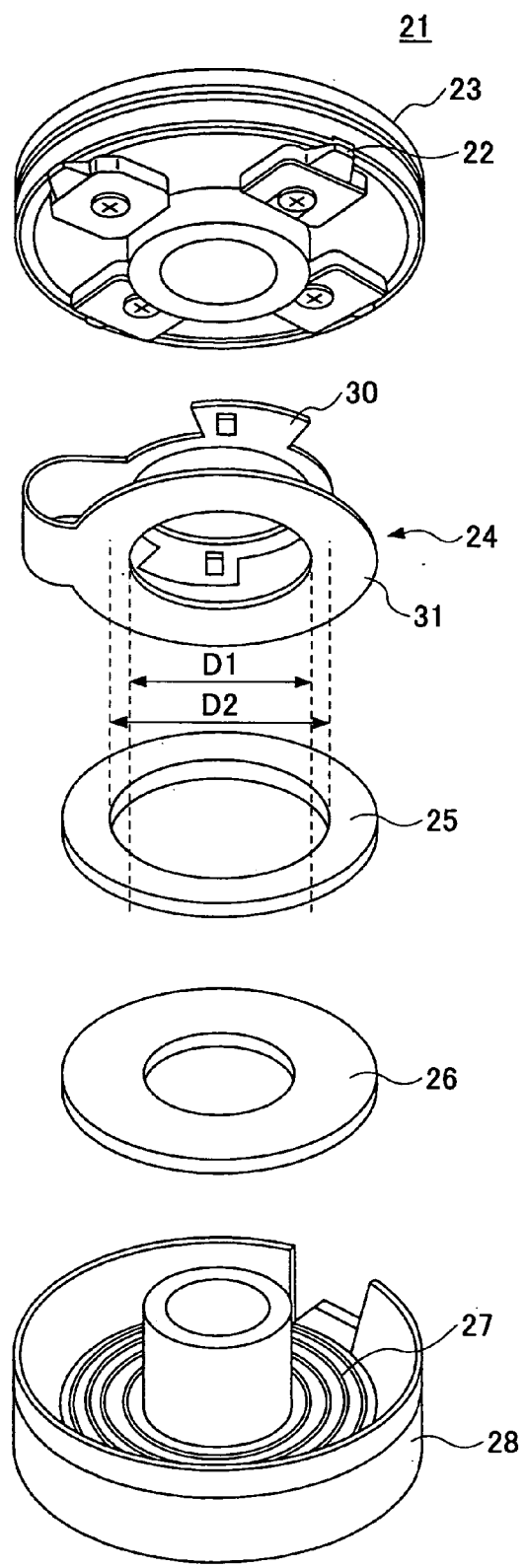
FIG. 2 is an exploded view of a rotary head drum apparatus according to the present invention.
Figure 3:
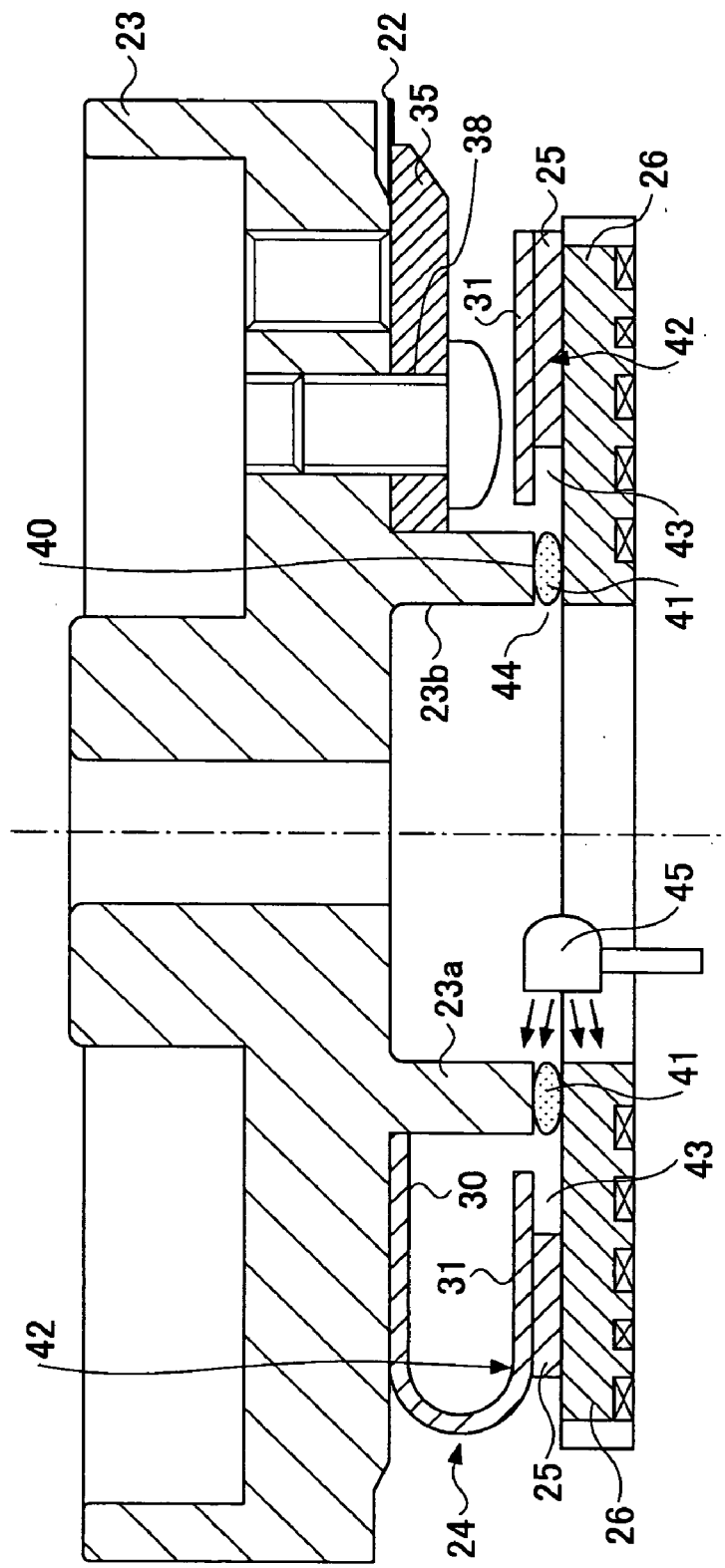
FIG. 3 is a cross-sectional view of a rotary drum forming the rotary head drum apparatus of the present invention.
Figure 4:
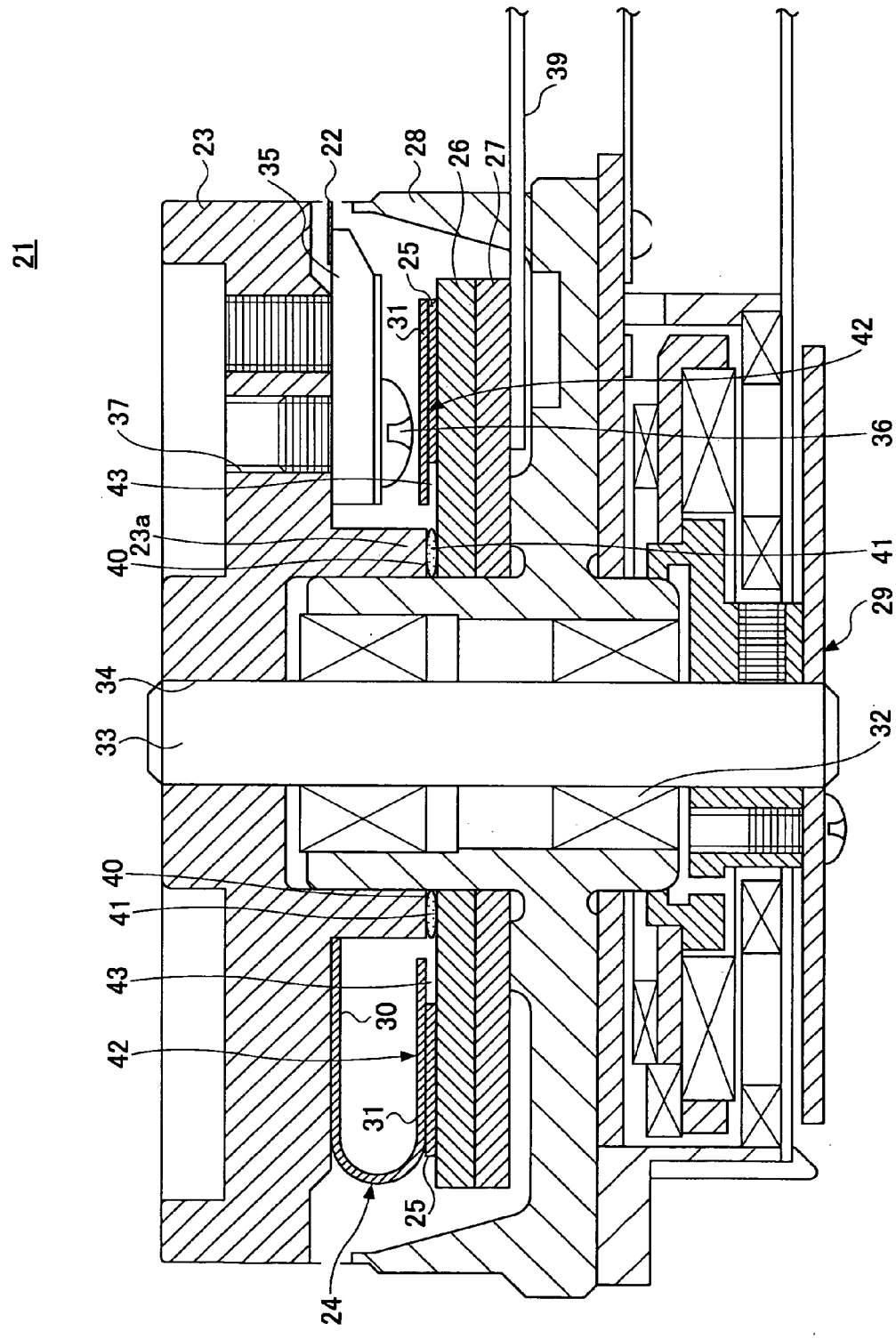
FIG. 4 is a cross-sectional view of the rotary head drum apparatus of the present invention.

FIG. 2 is an exploded view of a rotary head drum apparatus 21 according to the present invention. FIG. 3 is a cross-sectional view of a rotary drum 23 forming the rotary head drum apparatus 21. FIG. 4 is a cross-sectional view of the rotary head drum apparatus 21.

First, referring to FIGS. 2 and 4, the entire structure of the rotary head drum apparatus 21 is described.

As shown in FIG. 2, the rotary head drum apparatus 21 according to the present invention includes the rotary drum 23 to which magnetic heads 22 are fixed, a flexible printed circuit 24, a ring member 25, a rotating-side rotary transformer 26 fixed to the rotary drum 23, a stator-side rotary transformer 27, a stator drum 28 to which the stator-side rotary transformer 27 is fixed, and a motor 29 (refer to FIG.

4) that rotates the rotary drum 23. The rotary head drum apparatus 21 records information on and reproduces information from a magnetic tape that runs around the rotary head drum apparatus 21.

The rotating-side rotary transformer 26 is arranged to face the stator-side rotary transformer 27. The flexible printed circuit 24 includes an upper ring 30 and a lower ring 31. The flexible printed circuit 24 is provided between the bottom surface of the rotary drum 23 and the top surface of the ring member 25 and is bent back upon itself in a resilient manner. The flexible printed circuit 24 electrically connects the magnetic heads 22 and the rotating-side rotary transformer 26.

As shown in FIG. 4, a shaft 33 is supported for rotational movement in the center part of the stator drum 28 via a ball bearing 32. The rotary drum 23 is fixed to the top part of the shaft 33 that protrudes from the stator drum 28. Specifically, the shaft 33 is press fit into a shaft opening 34 formed in the rotary drum 23. The rotary drum 23 is mounted for rotatable movement with respect to the stator drum 28 via the shaft 33 in a freely-rotating manner.

The plurality of (four, for example, as illustrated) magnetic heads 22 are arranged on the rotary drum 23. Thus, the magnetic heads 22 are rotated as the rotary drum 23 is rotated. In the rotary head drum apparatus 21 of this embodiment, the four magnetic heads 22 are arranged at right angles. Among the four magnetic heads 22, one pair of the magnetic heads 22 that are separated by 180° serve as a recording head, and the other pair of the magnetic heads 22 that are separated by 180° serve as a reproducing head.

The magnetic heads 22 are arranged on the rotary drum 23 via head bases 35 (FIG. 4). The head bases 35 are formed by, for example, resin substrates, and the magnetic heads 22 are arranged at the respective radially outer end parts of the head bases 35. The magnetic heads 22 are fixed to the respective head bases 35 by an adhesive (not shown).

The head bases 35 are fixed to the rotary drum 23 by head fixing screws 36. That is, threaded openings 37 in which the fixing screws 36 are screwed are formed in the rotary drum 23. Additionally, insertion holes 38 (FIG. 3) are formed in the head bases 35. By positioning the head bases 35 on the bottom surface of the rotary drum 23 such that the insertion holes 38 become coaxial with the threaded openings 37, and screwing the head fixing screws 36 into the threaded openings 37 via the insertion holes 38, the head bases 35 are fixed to the rotary drum 23.

The flexible printed circuit 24 is provided on the bottom surface of the rotary drum 23, and is electrically connected to the rotating-side rotary transformer 26. For convenience of explanation, a detailed description of a fixing structure of the rotary drum 23 and the rotating-side rotary transformer 26 is given later.

Referring to FIG. 4, the motor 29 is provided under the fixing drum 28. When the motor 29 is driven, the shaft 33 is rotated and thus the rotary drum 23 is rotated.

The stator-side rotary transformer 27, which forms a part of a rotary transformer, is arranged on the fixing drum 28 at a position facing the rotating-side rotary transformer 26. The stator-side rotary transformer 27 is connected to a flexible substrate 39 for signal (FIG. 4) provided in the fixing drum 28.

The rotary transformer is formed by the rotating-side rotary transformer 26 and the stator-side rotary transformer 27 arranged in the above-mentioned opposing manner. It is possible to send and receive signals between the rotating-side rotary transformer 26 and the stator-side rotary transformer 27. At the time of recording, a recording signal for recording data on a magnetic tape is supplied to the magnetic heads 22 from the flexible substrate 39 via the rotary transformer. A generated signal that is read by the magnetic heads 22 from a magnetic tape at the time of reproducing is supplied to the flexible substrate 39 via the rotary transformer.

Referring to FIGS. 3 and 4, a description is given below of a structure for fixing the rotating-side rotary transformer 26 to the rotary drum 23.

As shown in FIGS. 3 and 4, a cylindrical connecting part 23a is formed as part of the rotary drum 23 at a position facing the rotating-side rotary transformer 26. An adhesive receiving gap 40 is formed at an axial end of the cylindrical connecting part 23a. An adhesive 41 for fixing the rotating-side rotary transformer 26 to the rotary drum 23 is provided in the adhesive receiving gap 40. The rotating-side rotary transformer 26 is fixed to the rotary drum 23 with the adhesive 41. In this embodiment, an ultraviolet curing type adhesive is used as the adhesive 41.

In the rotary head drum apparatus 21 according to this embodiment, an adhesive splashing prevention part 42 is provided on the rotating-side rotary transformer 26 and in close vicinity of the adhesive receiving gap 40. The adhesive splashing prevention part 42 includes the lower ring 31 of the flexible printed circuit 24 and the ring member 25 bonded and fixed on the rotating-side rotary transformer 26. The adhesive splashing prevention part 42 forms a chasm 43. By providing the adhesive splashing prevention part 42 in the aforementioned manner, even if the adhesive 41 splashes from the adhesive receiving gap 40, the adhesive splashing prevention part 42, which is provided in close vicinity of the adhesive receiving gap 40, avoids further splashing. Hence, it is possible to substantially reduce or eliminate contamination that may be caused by the adhesive 41.

In addition, in this embodiment, the ultraviolet curing type resin is used as the adhesive 41 as mentioned above. Further, as shown in FIG. 3, the adhesive receiving gap 40 has a radially inwardly facing opening 44 at the axial end of the cylindrical connecting part 23a; that is, in axial alignment with an inner wall 23b of the cylindrical connecting part 23a. Accordingly, it is possible to insert an ultraviolet irradiation apparatus 45 in the internal space of the rotary drum 23 and irradiate an ultraviolet light toward the adhesive 41 via the inwardly facing opening 44 of the adhesive receiving gap. By irradiating an ultraviolet light toward the adhesive 41 via the opening 44 in the aforementioned manner, it is possible to cure the ultraviolet curing type adhesive 41.

When the ultraviolet curing type adhesive 41 is used, however, there is a problem in that the adhesive 41 may not be completely cured in a case where the adhesive 41 is not positively subjected to an ultraviolet light. In accordance with the present invention, even if a part of the adhesive 41 is not completely cured, it is possible to eliminate negative effects caused by splashing of the adhesive 41 by the adhesive splashing prevention part 42.

It is conceivable to use a thermosetting resin as the adhesive 41. However, when a thermosetting resin is used, owing to the thermal resistance temperatures of the magnetic heads 22, the rotary transformer, and the ball bearing 32, for example, it is difficult or impossible to increase the heat to a temperature required for curing the resin. Thus, thermosetting resins are not preferable for the adhesive 41.

On the other hand, in this embodiment, a thermosetting resin is used for bonding the ring member 25 to the rotation-side rotary transformer 26 and for bonding the ring member 25 to the lower ring 31 of the flexible printed circuit 24 so as to form the adhesive splashing prevention part 42.

This is because it is possible to form the adhesive splashing prevention part 42 independently in advance by using a thermosetting resin adhesive before assembly of the adhesive splashing prevention part 42 with components that are weak against heat such as the magnetic heads 22. With the use of a thermosetting resin adhesive, it is possible to completely cure the adhesive and bond the rotating-side rotary transformer 26, the ring member 25, and the lower ring 31 of the flexible printed circuit 24. The rotating-side rotary transformer 26 on which the adhesive splashing prevention part 42 is formed is fixed to the rotary drum 23.

A further description is given below of the adhesive splashing prevention part 42 bonded with the thermosetting resin adhesive.

Figure 5:
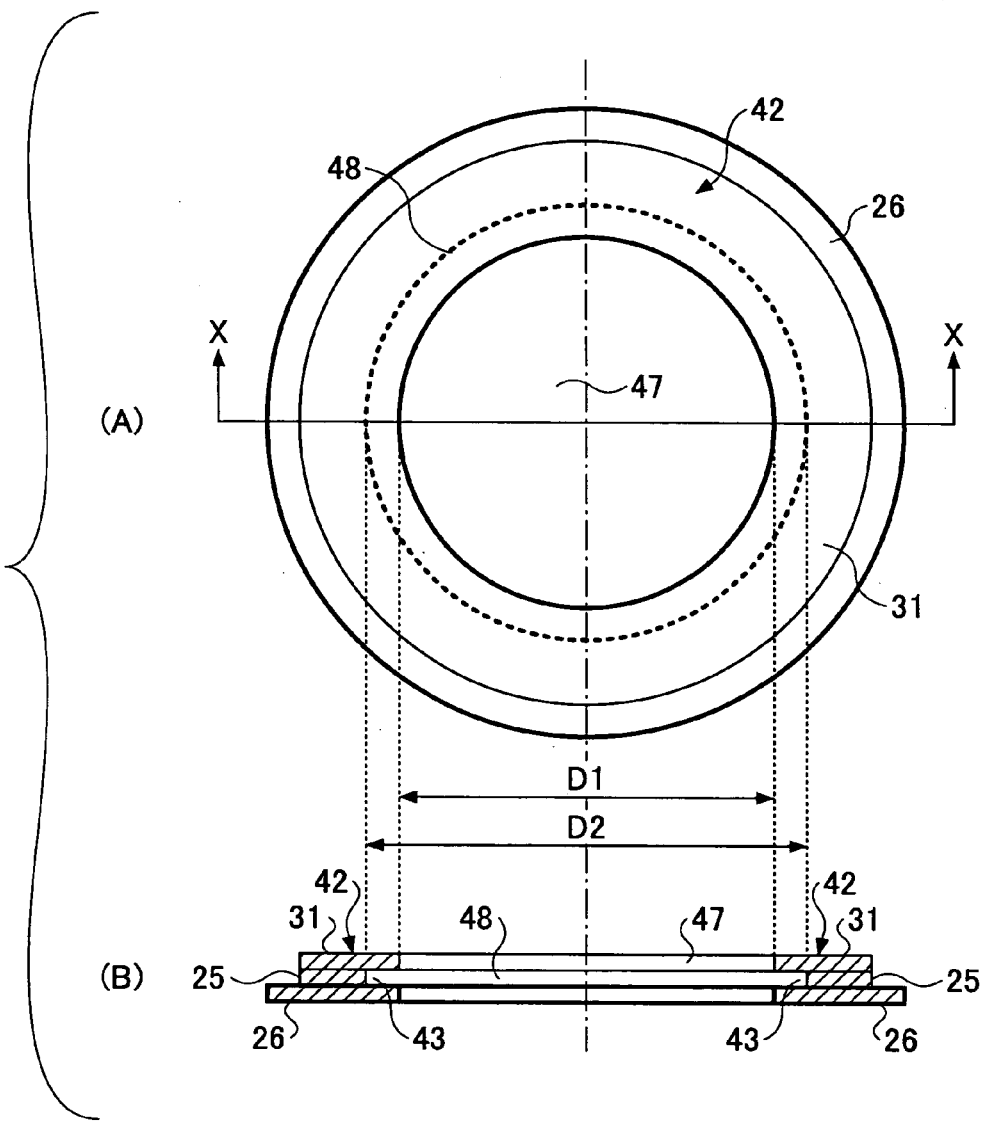
FIG. 5-(A) is a top plan view of an adhesive splashing prevention part provided in the rotary head drum apparatus.

FIG. 5 shows an adhesive splashing prevention part 42 provided in a rotary head drum apparatus 21 according to an exemplary embodiment of the present invention. FIG. 5-(A) is a top plan view of the adhesive splashing prevention part 42, and FIG. 5-(B) is a cross-sectional view of the adhesive splashing prevention part 42 taken along the line X—X in FIG. 5-(A).

The adhesive splashing prevention part 42 is provided on the top surface of the rotating-side rotary transformer 26 of the rotary drum 23, and is formed by the lower ring 31 of the flexible printed circuit 24 and the ring member 25. For example, an FPC and a substrate are used for the lower ring 31 of the flexible printed circuit 24, and a resin board, which serves as a reinforcing board, or a double-faced tape is used as the ring member 25.

The lower ring 31 of the flexible printed circuit 24, the ring member 25, and the rotating-side rotary transformer 26 have ring-like shapes. The lower ring 31 of the flexible printed circuit 24 has an opening 47 having the diameter of D1. The ring member 25 has an opening 48 having the diameter of D2. It should be noted that D1<D2 is satisfied, and a half of the difference between the diameter D1 and the diameter D2 is the depth in the radial direction of the chasm 43 of the adhesive splashing prevention part 42.

The bottom surface of the ring member 25 is bonded to the top surface of the rotating-side rotary transformer 26 of the rotary head drum apparatus 21 with a thermosetting resin. The lower ring 31 of the flexible printed circuit 24 is bonded to the top surface of the ring member 25 with a thermosetting resin. It is possible to form the chasm 43 of the adhesive splashing prevention part 42 by making the diameter D1 of the hole 47 of the lower ring 31 smaller than the diameter D2 of the hole 48 of the ring member 25. It is possible to arbitrarily vary the position and depth of the chasm 43 by varying the diameter D1 of the hole 47 of the lower ring 31 and the diameter D2 of the hole 48 of the ring member 25.

Figure 6:
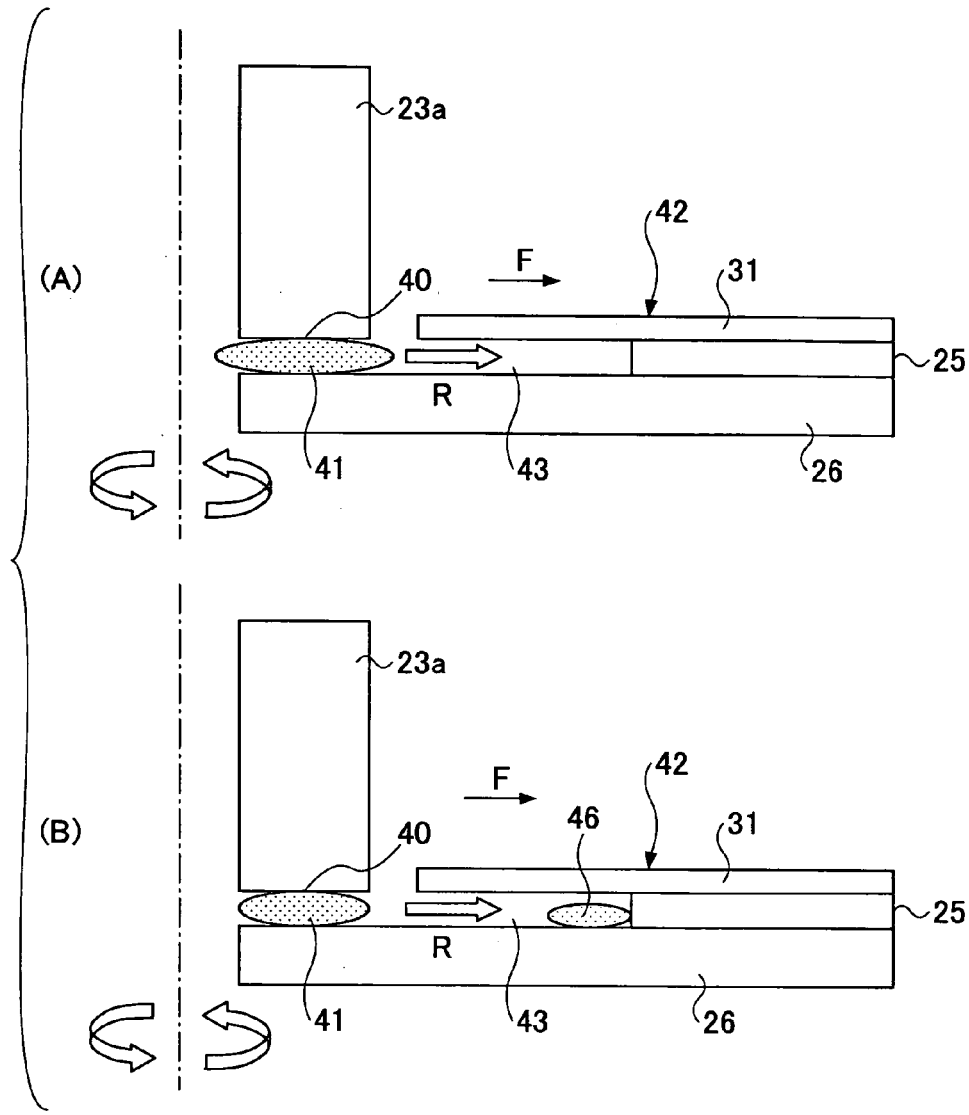
FIG. 6-(A) is an enlarged cross-sectional view showing a state before an adhesive splashes from the adhesive receiving gap.

FIG. 6 is a schematic diagram for explaining the mechanism of receiving the adhesive 41 by the chasm 43 of the adhesive splashing prevention part 42. FIG. 6-(A) represents a state before splashing of the adhesive 41, and FIG. 6-(B) represents a state after splashing of the adhesive 41.

The adhesive splashing prevention part 42 is provided on the top surface of the rotating-side rotary transformer 26. The adhesive receiving gap 40, which is formed at the axial end of the cylindrical connecting part 23a (FIG. 3), is provided at the radially inner side of the rotating-side rotary transformer 26. Referring to FIG. 6-(A), since a large quantity of the adhesive 41 is applied, the adhesive 41 protrudes from the adhesive receiving gap 40. In such a condition, when the rotary head drum apparatus 21 is rotated around the axis indicated by a broken line in the direction indicated by the arrows in FIG. 6-(A), a centrifugal force is generated in the direction indicated by an arrow F. Consequently, under the influence of the centrifugal force, a non-cured part of the adhesive 41 in the adhesive receiving gap 40 splashes from the adhesive receiving gap 40 in the direction indicated by an arrow R.

As shown in FIG. 6-(B), the splashing adhesive 46 is received by the chasm 43 of the adhesive splashing prevention part 42. The splashing adhesive 46 collides with the ring member 25 of the chasm 43, and it is possible to stop further splashing of the splashing adhesive 46.

A description is given below of another embodiment of the present invention.

Figure 7:
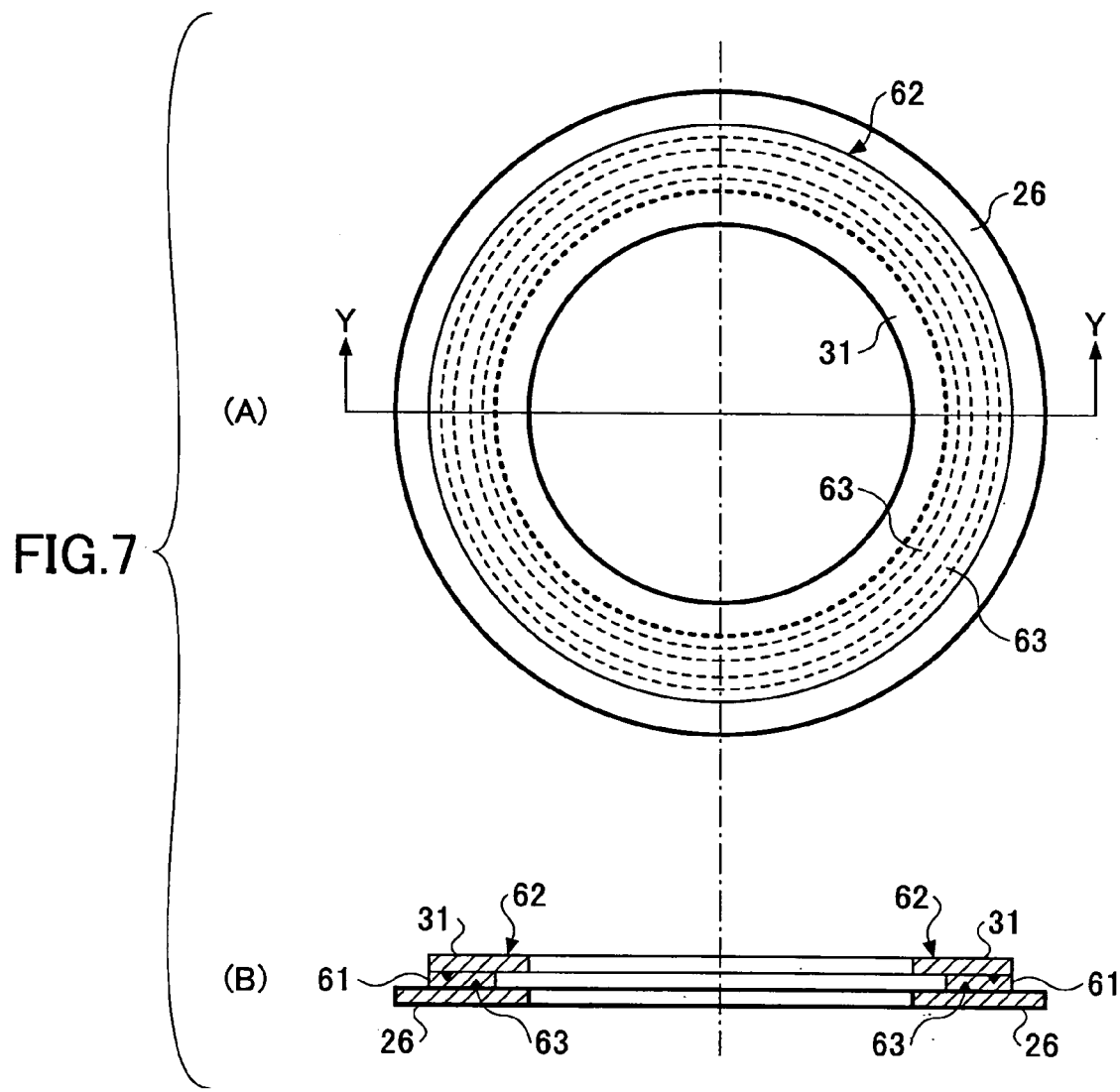
FIG. 7-(A) is a top plan view of another adhesive splashing prevention part including a ring member having V-grooves formed therein.
Figure 8:
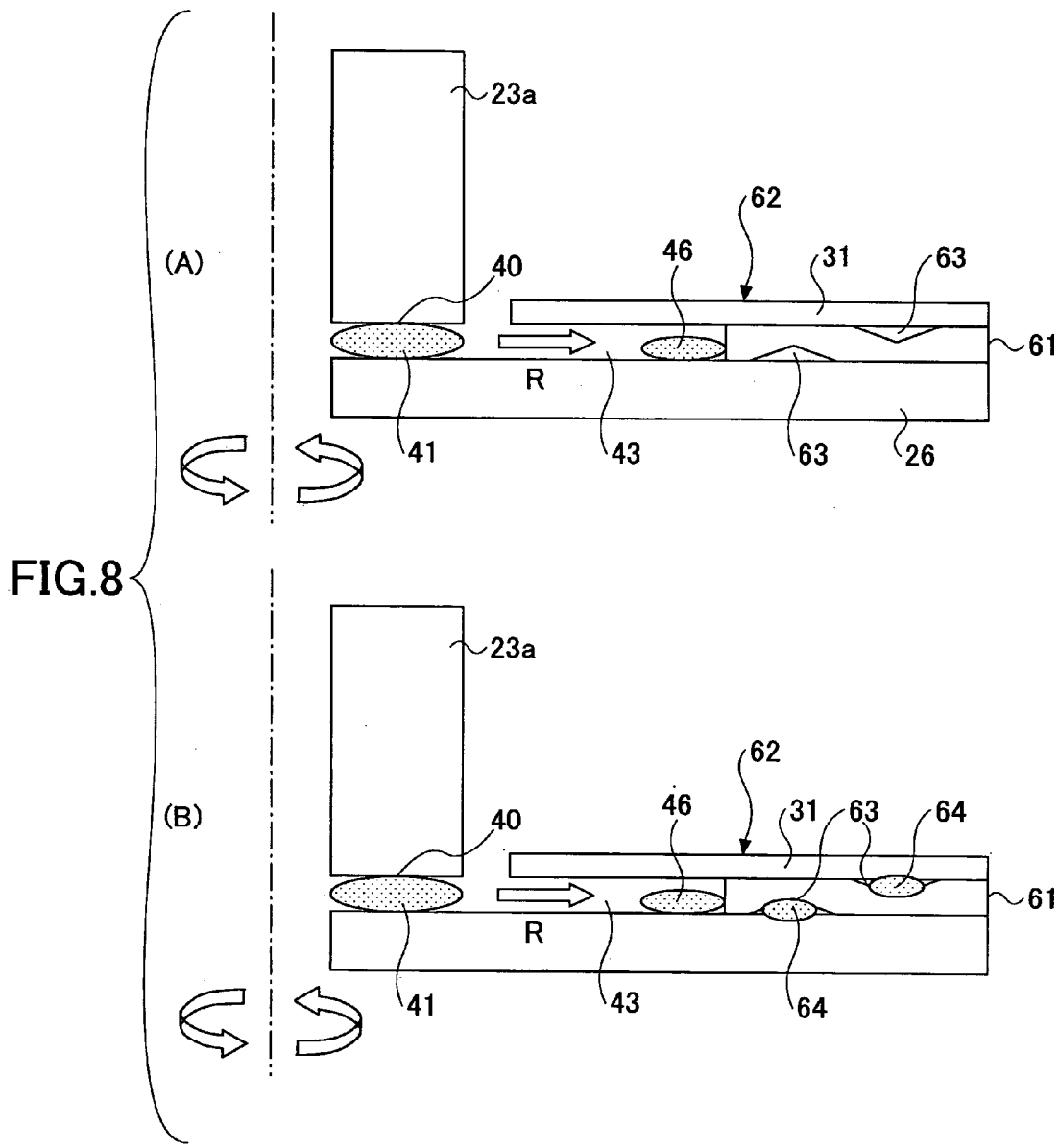
FIG. 8-(A) is an enlarged cross-sectional view showing a state before bonding of a ring member having the V-grooves formed therein.

FIG. 7 shows an adhesive splashing prevention part 62 having V-grooves 63 formed in a ring member 61. FIG. 7-(A) represents a top plan view of the adhesive splashing prevention part 62, and FIG. 7-(B) represents a cross-sectional view of the adhesive splashing prevention part 62 taken along the line Y—Y in FIG. 7-(A). FIG. 8 is an enlarged cross-sectional view of the adhesive splashing prevention part 62. FIG. 8-(A) represents a state where the V-grooves 63 are formed in the ring member 61 and the ring member 61 is not bonded to the lower ring 31 and the rotating-side rotary transformer 26. FIG. 8-(B) represents a state where a thermosetting resin 64 is filled in the V-grooves 63 formed in the ring member 61 and the ring member 61 is bonded to the lower ring 31 and the rotating-side rotary transformer 26. In FIG. 8, those parts that are the same as those corresponding parts in FIGS. 5 and 6 are omitted for convenience.

The V-grooves 63 are formed in ring shapes: one in the bottom surface of the ring member 61 along the inner edge thereof and one in the top surface of the ring member 61 along the outer edge thereof. The ring member 61 and the lower ring 31 of the flexible printed circuit 24, and the ring member 61 and the rotating-side rotary transformer 26 are bonded with no or substantially no space therebetween by filling (inserting) the thermosetting resin 64 in the V-grooves 63. Hence, it is possible to prevent the splashing adhesive 46 received by the chasm 43 of the adhesive splashing prevention part 62 from further splashing from a space in the adhesive splashing prevention part 62, i.e., a space between the ring member 61 and the lower ring 31 and/or a space between the ring member 61 and the rotating-side rotary transformer 26.

A plurality of the V-grooves 63 may be formed in the top surface and the bottom surface of the ring member 61. In addition, the shapes of the V-grooves 63 are not limited to the V-shapes, and may be other shapes as long as it is possible to fill (insert) the thermosetting resin 64 in the grooves.

A description is given below of still another embodiment of the present invention.

Figure 9:
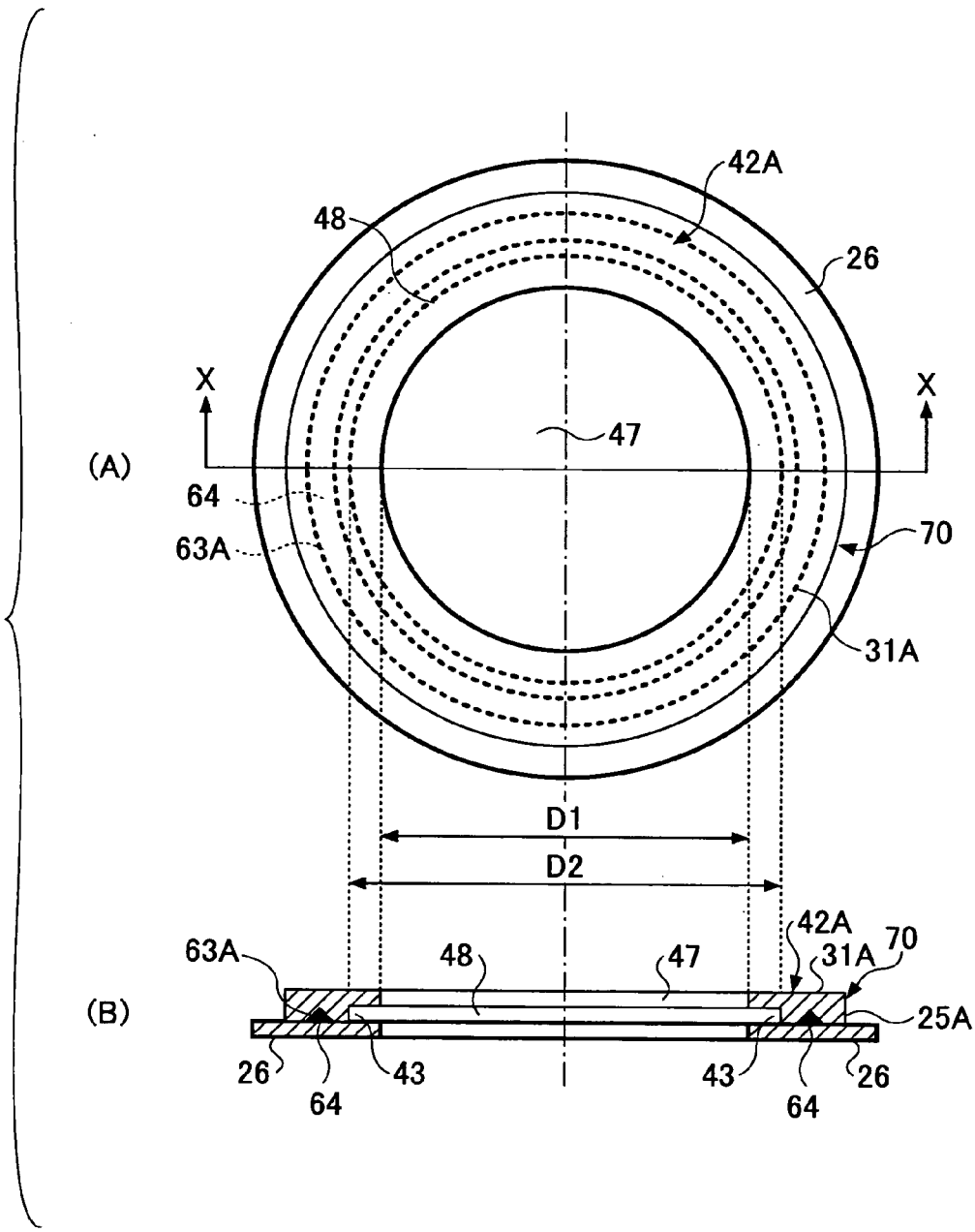
FIG. 9-(A) is a top plan view of still another adhesive splashing prevention part.

FIG. 9 shows an adhesive splashing prevention part 42A according to this embodiment provided in the rotary head drum apparatus 21. FIG. 9-(A) is a top plan view of the adhesive splashing prevention part 42A, and FIG. 9-(B) is a cross-sectional view of the adhesive splashing prevention part 42A taken along the line X—X in FIG. 9-(A).

The adhesive splashing prevention part 42A includes an adhesive splashing prevention member 70 having as an integral part a part 31A corresponding to the lower ring 31 shown in FIG. 5 and a part 25A corresponding to the ring member 25 shown in FIG. 5. In addition, a groove 63A having a ring shape is formed in the bottom surface of the part 25A corresponding to the ring member 25. With the thermosetting resin adhesive 64 filled (inserted) in the entire groove 63A, the part 25A is bonded to the rotating-side rotary transformer 26 with the thermosetting resin adhesive 64 with no or substantially no space in between. The bonded adhesive splashing prevention member 70 forms the chasm 43 on the rotating-side rotary transformer 26, which chasm 43 forms a space for receiving the splashing adhesive 46 that splashes from the adhesive receiving gap 40.

As mentioned above, according to the present invention, it is possible to positively provide the adhesive splashing prevention part (42, 62, 42A) in the rotary head drum apparatus (21) with no or substantially space in between by using the thermosetting resin adhesive (64). In addition, it is possible to form with an arbitrary size a space (43) of the adhesive splashing prevention part (42, 62, 42A) for receiving a splashing adhesive (46).

The present invention is not limited to the specifically disclosed embodiments, and variations and modifications may be made without departing from the scope of the present invention.

The present application is based on Japanese priority application No. 2003-138803 filed on May 16, 2003, the entire contents of which are hereby incorporated by reference.

What is claimed is:

1. A rotary head drum apparatus, comprising:
    a stator drum;
    a rotary drum provided with a plurality of magnetic heads and rotating said magnetic heads, said rotary drum being mounted for rotational movement with respect to said stator drum;
    a rotary transformer including a stator-side rotary transformer provided on said stator drum and a rotating-side rotary transformer fixed to said rotary drum, said stator-side rotary transformer and said rotating-side rotary transformer being adapted to send and receive signals to each other, wherein an adhesive providing gap is disposed between said rotating-side rotary transformer and said rotary drum for receiving an adhesive for bonding said rotating-side rotary transformer to said rotary drum; and
    an adhesive splashing prevention part provided on said rotating-side rotary transformer and receiving adhesive splashing from said adhesive providing gap,
    said adhesive splashing prevention part including:
        a first ring member having an opening in a center thereof and bonded to said rotating-side rotary transformer with a thermosetting resin adhesive; and
        a second ring member bonded to said first ring member with the thermosetting resin adhesive and having in a center thereof an opening whose diameter is smaller than a diameter of the opening of said first ring member,
        wherein said adhesive splashing prevention part forms a space receiving adhesive splashing from said adhesive providing part.

2. The rotary head drum apparatus as claimed in claim 1, wherein a flexible printed circuit is connected to a bottom surface of the rotary drum,
    the flexible printed circuit includes an upper ring connected to the rotary drum and a lower ring connected to the rotating-side rotary transformer, and electrically connects the magnetic heads with the rotating-side rotary transformer, and
    the lower ring is used as the second ring member.

3. The rotary head drum apparatus as claimed in claim 2, wherein the first ring member has a ring-shaped groove formed in at least one of a top surface and a bottom surface thereof, and a thermosetting resin is disposed in said groove.

4. The rotary head drum apparatus as claimed in claim 1, wherein the first ring member has a ring-shaped groove formed in at least one of a top surface and a bottom surface thereof, and a thermosetting resin is disposed in said groove.

5. The rotary head drum apparatus as claimed in claim 1, wherein the adhesive splashing prevention part includes an adhesive splashing prevention member including:
    a first part corresponding to the first ring member;
    a second part corresponding to the second ring member; and
    a ring-shaped groove in a bottom surface of said first part, said first and second parts forming an integral part, and
    said adhesive splashing prevention member is bonded to the rotating-side rotary transformer with a thermosetting resin adhesive disposed in said ring-shaped groove.

6. The rotary head drum apparatus as claimed in claim 1, wherein the first ring member is bonded to the rotating-side rotary transformer with the thermosetting resin adhesive with substantially no space in between, and
    the second ring member is bonded to the first ring member with the thermosetting resin adhesive with substantially no space in between.

7. The rotary head drum apparatus as claimed in claim 1, wherein the adhesive splashing prevention part is formed by the first ring member, the second ring member, and the rotating-side rotary transformer that are formed as a one-piece part.

\* \* \* \* \*